Oct. 16, 1956  F. J. KENNEDY  2,767,239
ELECTRICAL RACEWAY WITH REDUCED INSIDE FRICTION
Filed April 29, 1953
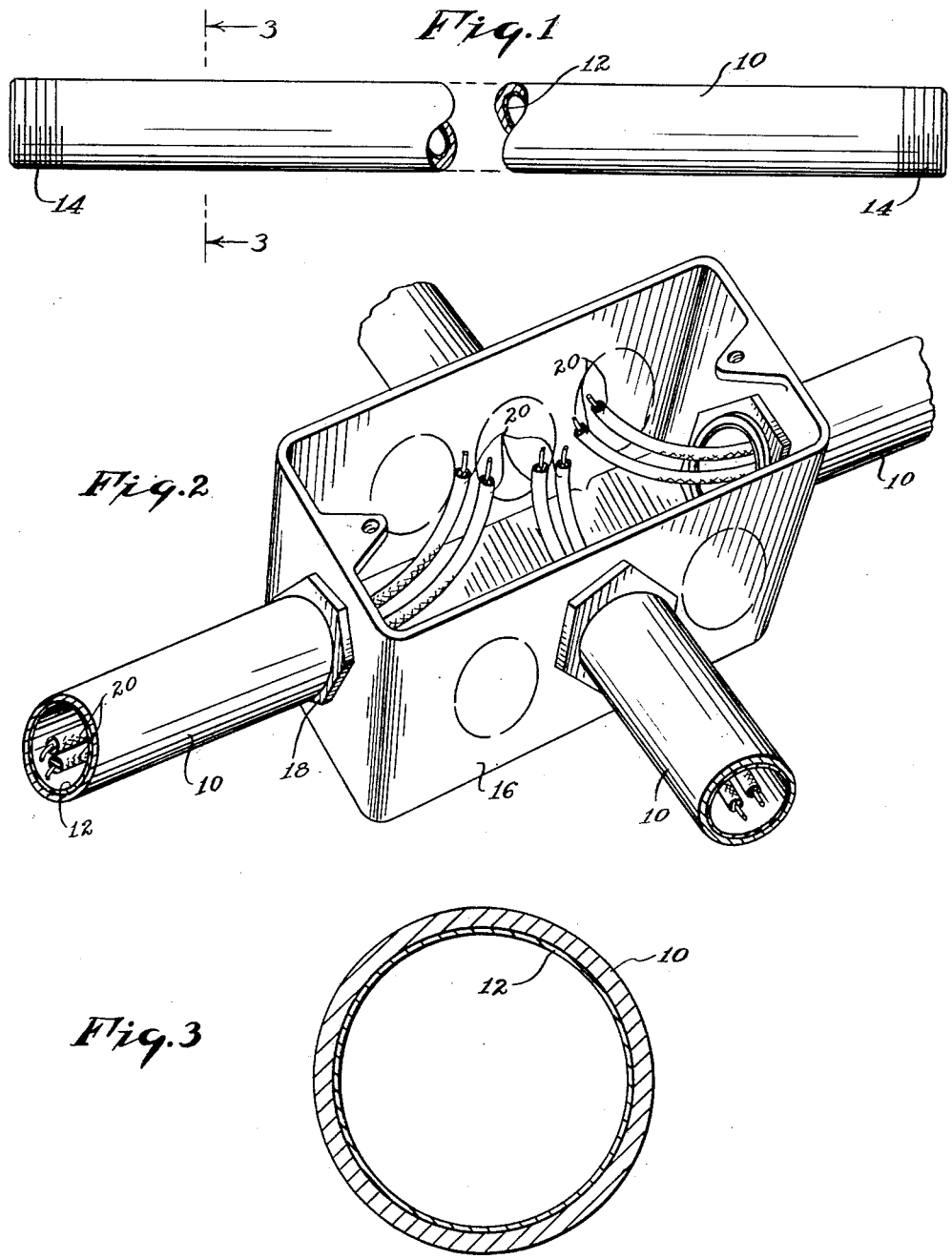

ately (, United States Patent Office 2,767,239
Patented Oct. 16, 1956

2,767,239

ELECTRICAL RACEWAY WITH REDUCED INSIDE FRICTION

Frank J. Kennedy, Mount Lebanon, Pa., assignor to National Electric Products Corporation, Pittsburgh, Pa., a corporation of Delaware Application April 29, 1953, Serial No. 352,007

4 Claims. (Cl. 174—68)

This invention relates to electrical raceways and more especially to an electrical raceway having an inside lining or coating which imparts improved fishing properties to the raceway.

It is an object of the invention to provide an improved electrical raceway with an inside surface that has a lower coefficient of friction and resulting improved fishing properties as compared with electrical raceways of the prior art.

One of the principal problems involved in the fishing of conductors, through electrical raceways, is the friction encountered between the conductors and the inside face of the raceway. Contractors use various expedients for reducing this friction, such as grease or soap stone on the conductors, and the cost of electrical installations is substantially reduced by cutting down the time and labor of fishing conductors through the electrical raceways.

With this invention, the fishing effort, that is, the force required to pull the conductors through a raceway, is reduced between 25 and 33% as compared with the best electrical raceways which I have been able to procure for purposes of comparison; and the fishing effort of the raceways of this invention is only one-half of that required for some electrical raceways which are sold in the open market.

Other objects, features and advantages of the invention will appear or be pointed out as the description proceeds.

In the drawing, forming a part hereof, the different figures of the drawing show like reference characters which indicate corresponding parts in all the views.

Figure 1 is a side elevation of an electrical raceway embodying this invention;

Figure 2 is a perspective view showing the raceway of this invention connected with an electrical outlet box from which conductors are pulled through the raceway; and Figure 3 is a greatly enlarged, sectional view taken on the line 3—3 of Figure 1.

An electrical raceway 10, shown in Figure 1, has a smooth, inside face lined with a coating 12. The raceway shown is a rigid conduit of cylindrical cross section, but this is merely representative of electrical raceways having inside surfaces along which the conductors have a friction drag while being fished through the raceway.

The conduit raceway 10 has threaded ends 14, which are connected with a junction box 16 by means of clamping nuts 18 when the raceway is installed. Figure 2 shows a raceway 10 with a number of conductors 20 located within it. Two of the conductors 20 are led out of the raceway at the box 16, but others continue on beyond the box through another section of the raceway 10.

The coating 12, which lines the raceway 10, is preferably made of ground aluminum in stearic acid with a binder. The aluminum and the stearic acid serve to reduce the coefficient of friction on the inside surface of the raceway. The binder makes the aluminum and stearic acid remain in place.

The aluminum is ground, preferably to a flake condition, in stearic acid, in accordance with the practice employed for making aluminum paste for paint. This paste can be applied to the inside surface of the raceway without a binder for some purposes, but a binder is used when the raceway is required to meet the conventional Underwriters' specifications for raceway linings.

The paste used for this invention is preferably a mixture comprising 65 to 74% aluminum content, and 35 to 26% stearic acid. Thus the ratio of ground aluminum to stearic acid is approximately from two to one to three to one.

The binder used for the lining is preferably a varnish, or other vehicle with which the paste is mixed to make an enamel. One example of a suitable varnish comprises 50% solids consisting of modified phenolic resin and vegetable oil, there being about twice as much resin as vegetable oil. The varnish contains 50% volatile portions of which approximately 49% is made up of aliphatic hydrocarbons, with about 1% drier. Other varnishes can be used as the vehicle for the ground metal paste of this invention.

The amount of paste mixed with the vehicle depends upon the consistency desired for the particular mode of application of the coating to the inside of the raceway. Satisfactory results are obtained by mixing two gallons of the varnish with one gallon of volatile diluent, such as a petroleum naphtha, and 1½ pounds of the aluminum paste. This produces about 3.12 gallons of the coating material for the inside of the raceway.

Three pounds of the aluminum paste can be used to make five gallons of enamel by mixing ⅔ of vehicle including the varnish, drier and aluminum paste, and ⅓ of volatile aliphatic hydrocarbon, such as naphtha.

The drier included in the vehicle is preferably a cobalt drier. Cobalt salts which are suitable include cobalt naphthenate, and the ricinoleate, linoleate and oleate of cobalt. These same salts of nickel can be used for driers, but lead salts have been found to be unsatisfactory because they sometimes produce discoloration of the lining which makes the raceway commercially unacceptable.

The raceway of this invention is coated with the aluminum and stearic acid, mixed with the vehicle which hardens to form a binder, and the coating is dried by exposure to air which may be heated to facilitate the drying. The coating should not be baked, however, because the improved fishing properties are seriously impaired by the high temperature required for baking.

The preferred embodiment has been illustrated and described, but changes and modifications can be made without departing from the invention as defined in the claims.

What is claimed is:

1. An electrical conduit installation including at least one conductor, a ferrous metal electrical raceway comprising a rigid tube of circular cross section enclosing said conductor and having a smooth inside surface, and a protecting coating between the conductor and the ferrous metal of the tube, and covering the ferrous metal of the inside surface and comprising a layer of enamel including a hardened varnish through which is distributed stearic acid and flakes of aluminum.

2. An electrical conduit installation including at least one conductor, an electrical raceway enclosing said conductor and constructed of ferrous metal and having an inside surface, and a hardened protective coating between the conductor and the ferrous metal of the tube, and over the ferrous metal of said inside surface, the coating including aluminum particles and a quantity of stearic acid mixed with the aluminum particles the amount of stearic acid being substantially less than the amount of aluminum in said hardened coating that covers the ferrous metal.

3. The combination of a metal electrical raceway, a conductor in the raceway, and a protecting coating of enamel between the conductor and the metal of the raceway, said enamel being bonded to the inside surface of the raceway, the enamel containing a varnish, a quantity of aluminum particles less than the quantity of varnish and distributed throughout the varnish, and a quantity of stearic acid distributed throughout the varnish with the aluminum particles.

4. An electrical raceway including a rigid ferrous metal tube of circular cross section and having a smooth inside surface, and a protecting coating of enamel bonded to the ferrous metal of the inside surface said coating originally including a varnish consisting of 50% solids consisting of modified phenolic resin and vegetable oil, there being about twice as much resin as vegetable oil, 50% volatile portions of which about 49% is made up of aliphatic hydrocarbons with about 1% of drier, the varnish having distributed therein a mixture of aluminum flakes and stearic acid with the quantity of aluminum and stearic acid equal to about one quarter of the amount of varnish left after evaporation of the volatile portions of the varnish.

References Cited in the file of this patent

UNITED STATES PATENTS

| | | |
|---|---|---|
| 817,086 | Murphy | Apr. 3, 1906 |
| 1,804,991 | Johnson | May 12, 1931 |
| 2,369,629 | Wood et al. | Feb. 13, 1945 |
| 2,392,346 | Waldie | Jan. 8, 1946 |
| 2,394,500 | Waldie | Feb. 5, 1946 |
| 2,441,945 | Frolich et al. | May 25, 1948 |
| 2,597,706 | Couchman | May 20, 1952 |

OTHER REFERENCES

Materials of Construction, Mills et al., 5th ed. 1939, pages 514, 515, 516, 528, John Wiley and Sons, New York. (Copy in Div. 52, Patent Office.)